(12) United States Patent
Russ et al.

(10) Patent No.: US 8,931,734 B2
(45) Date of Patent: Jan. 13, 2015

(54) RAM AIR TURBINE RELEASE CABLE ASSEMBLY

(75) Inventors: David Everett Russ, Rockford, IL (US); Kanthi Gnanam Kannan, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 202 days.

(21) Appl. No.: 13/614,535

(22) Filed: Sep. 13, 2012

(65) Prior Publication Data

US 2014/0070049 A1  Mar. 13, 2014

(51) Int. Cl.
*B64D 41/00* (2006.01)

(52) U.S. Cl.
USPC .......................................................... 244/58

(58) Field of Classification Search
USPC ............. 244/56, 58, 131; 416/142, 143, 23, 9
See application file for complete search history.

(56) References Cited

U.S. PATENT DOCUMENTS

| | | | | |
|---|---|---|---|---|
| 4,609,166 A * | 9/1986 | Brennan | .................... | 244/118.5 |
| 4,676,458 A | 6/1987 | Cohen | | |
| 4,742,976 A * | 5/1988 | Cohen | ............................. | 244/58 |
| 5,820,074 A | 10/1998 | Trommer et al. | | |
| 7,416,392 B2 * | 8/2008 | Russ | .............................. | 416/142 |
| 8,602,736 B2 * | 12/2013 | Russ | .............................. | 416/143 |
| 8,651,815 B2 * | 2/2014 | Russ | .............................. | 416/143 |
| 2007/0237640 A1 * | 10/2007 | Russ | .............................. | 416/142 |
| 2010/0243839 A1 * | 9/2010 | Westerink | .................. | 248/276.1 |
| 2011/0229309 A1 * | 9/2011 | Russ | .............................. | 415/126 |
| 2011/0229342 A1 * | 9/2011 | Russ | .............................. | 416/246 |
| 2013/0256453 A1 * | 10/2013 | Russ | .............................. | 244/54 |

OTHER PUBLICATIONS

French Office Action for application No. FR 1356867, mailed Nov. 21, 2011, 1 page.

* cited by examiner

*Primary Examiner* — Philip J Bonzell
(74) *Attorney, Agent, or Firm* — Cantor Colburn LLP

(57) ABSTRACT

A ram air turbine assembly is provided including a release cable coupled at a first end to a turbine release pin and coupled at a second end to a release lever. Aluminum tubing surrounds a portion of the release cable. An upper cable bracket supports the aluminum tubing adjacent the first end of the release cable. A lower cable bracket supports the aluminum tubing adjacent the second end of the release cable. The lower cable bracket includes a threaded bushing having an axial bore for receiving the release cable. The threaded bushing is in direct contact with an end fitting coupled to the aluminum tubing.

13 Claims, 6 Drawing Sheets

RAM AIR TURBINE RELEASE CABLE ASSEMBLY

BACKGROUND OF THE INVENTION

Exemplary embodiments of this invention generally relate to emergency power supplies for aeronautical applications, and more particularly, to an improved ram air turbine for generating emergency power for an aircraft in flight.

Aircrafts include, as standard equipment, a back-up power source for use in times of power outage in the main power system. This standard equipment has been in the form of a ram air-driven turbine. The back-up equipment is stowed in a storage bay within the fuselage or wing of the aircraft. If/when needed, the back-up equipment can be deployed into the airstream where the passing air relative to the speed of the aircraft causes the turbine blades to rotate.

One example of such back-up equipment is a ram air turbine (RAT). A RAT may generate hydraulic power, electric power, or both. The turbine is coupled to suitable power generating equipment, such as a hydraulic pump for hydraulic power, or an electric generator for electric power, or both in the case of a hybrid RAT.

The RAT storage bay of the aircraft, as well as an access door to the RAT storage bay, are sized to store the ram air turbine and a deployment mechanism for the ram air turbine with only enough space to closely receive the equipment, thereby minimizing wasted space. In most cases, the structural configuration of the storage bay cannot be modified without compromising the structural integrity of the aircraft.

Due to the desire to reduce weight and maximize space, the overall size and particularly the length of newer ram air turbines has been reduced. Consequently, the bend radius of the conventional flexible sheath of the turbine release cable is too large to fit within the available space. In addition, for course pitch start up ram air turbines, the initial angle of the turbine blades applies a substantial load to the release cable thereby increasing the stress.

BRIEF DESCRIPTION OF THE INVENTION

According to one embodiment of the invention, a ram air turbine assembly is provided including a release cable coupled at a first end to a turbine release pin and coupled at a second end to a release lever. Aluminum tubing surrounds a portion of the release cable. An upper cable bracket supports the aluminum tubing adjacent the first end of the release cable. A lower cable bracket supports the aluminum tubing adjacent the second end of the release cable. The lower cable bracket includes a threaded bushing having an axial bore for receiving the release cable. The threaded bushing is in direct contact with an end fitting coupled to the aluminum tubing.

According to an alternate embodiment of the invention, a ram air turbine assembly is provided including a lower cable bracket for supporting a portion of a release cable. The lower cable bracket includes a threaded bushing having an axial bore for receiving the release cable. The threaded bushing directly contacts an end fitting coupled to the first end of the aluminum tubing.

According to yet another embodiment of the invention, a release cable assembly is provided including a release cable coupled at a first end to a turbine release pin and coupled at a second end to a release lever. A lower cable bracket supports the release cable adjacent the first end. An upper cable bracket supports the release cable adjacent the second end. A portion of the release cable is surrounded by an aluminum tubing.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
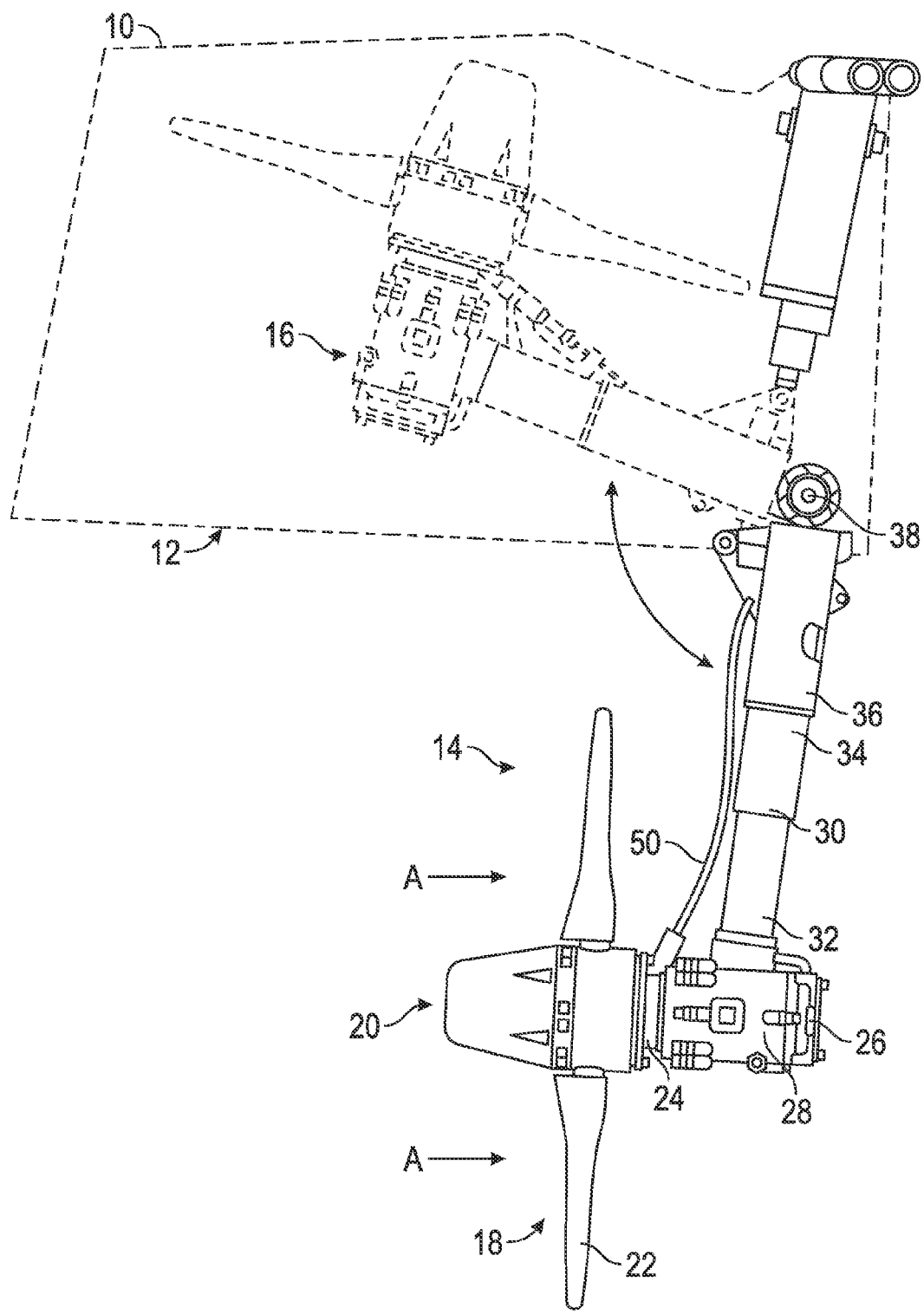
FIG. 1 is a side view of an exemplary ram air turbine assembly.
Figure 2:
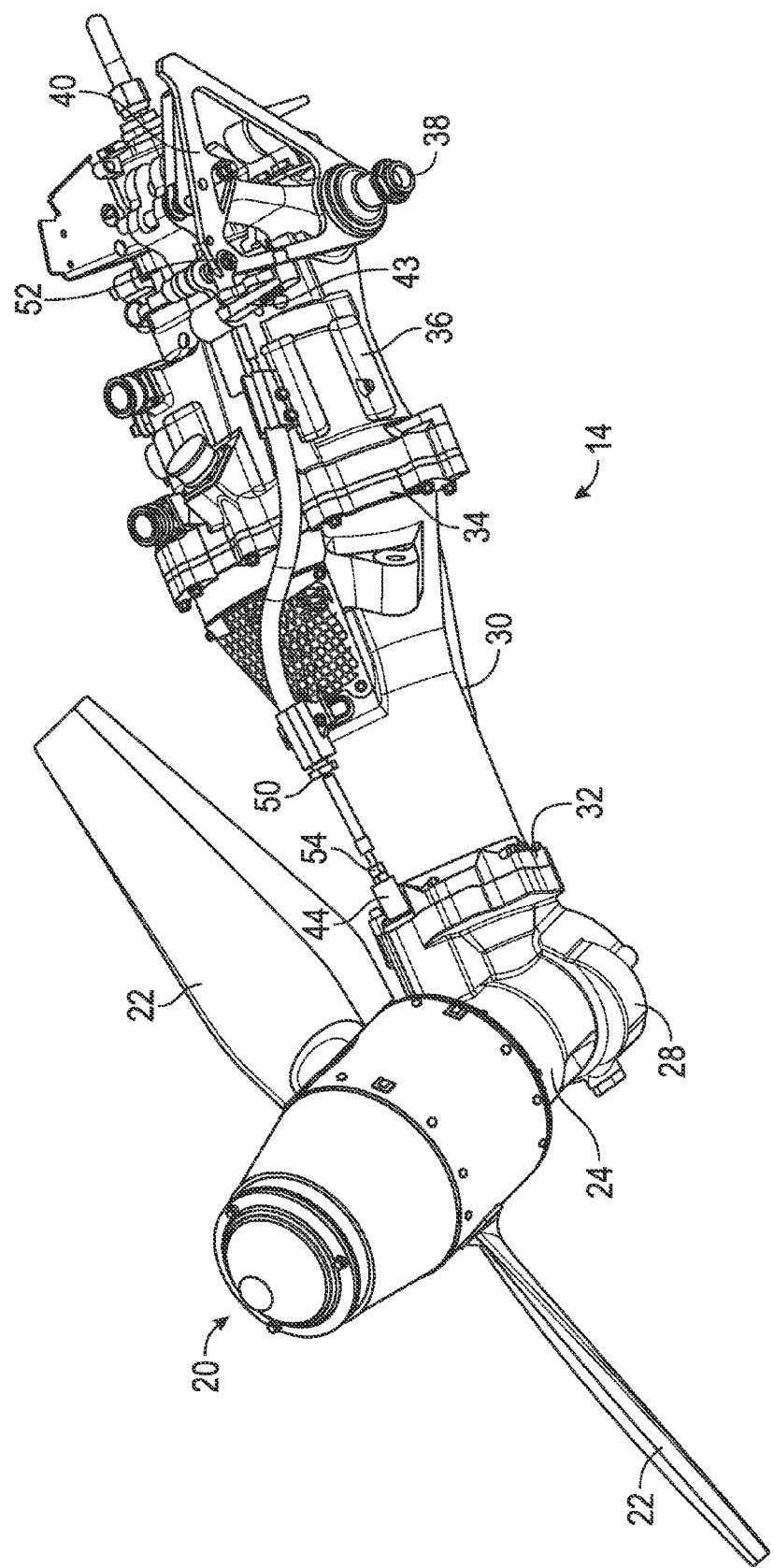
FIG. 2 is a perspective view of an exemplary ram air turbine in a stowed position.

Referring now to FIGS. 1 and 2, an exemplary ram air turbine (RAT) assembly 14 is illustrated. The aircraft 10 schematically shown in FIG. 1 includes an opening or a hatch 12 through which the RAT assembly 14 moves from a stowed position 16 to a deployed position 18. The RAT assembly 14 includes a turbine 20 having at least one turbine blade 22 that rotates about a turbine driveshaft 24. The turbine driveshaft 24 is coupled to a lower gear box 28 adjacent a first end 26. In the stowed position, illustrated using phantom lines, the RAT assembly 14 is disposed within the aircraft structure 10 and the turbine blades 22 are fixed in a desired orientation to prevent contact with the surrounding structure. The desired orientation of the turbine blades 22 provides for movement of the RAT assembly 14 through the opening of the aircraft structure 10.

The RAT assembly 14 also includes a strut 30 connected at a first end 32 to the turbine 20 adjacent the lower gear box 28, and coupled at a second, opposite end 34 to a generator housing 36. The generator housing 36, and therefore the strut 30 and turbine 20, is supported on the aircraft structure and is configured to rotate about a pivot 38 to provide for movement of the RAT assembly 14 between the stowed position 16 and the deployed position 18. The generator housing 36 supports a generator (not shown) that is driven by the plurality of turbine blades 22. The example generator is disposed within the generator housing 36. The turbine blades 22 rotate in response to the airstream A along the outside of the aircraft structure 10 to drive the generator. As appreciated, although the example RAT assembly 14 is disclosed with a generator, the ram air turbine 20 could also drive any other device, such as a hydraulic pump for example.

The RAT assembly 14 includes a release lever 40 configured to rotate about a pivot 38 attached to the generator housing 36. The RAT assembly 14 also includes a turbine release pin 44 that engages the turbine driveshaft 24 by way of a driveshaft aperture (not shown), such as a hole, indentation, or slot for example. A release cable 50 extends from the release lever 40 to the turbine release pin 44 such that a first end 52 of the release cable 50 is fastened to the release lever 40 and a second, opposite end 54 of the release cable 50 is coupled to the turbine release pin 44. The release lever 40 rotates about pivot 38 until engaging a stop 43 during deployment of the RAT assembly 14.

Movement of the RAT assembly 14 to a deployed position includes movement of the generator housing 36 about the pivot 38. The movement of the generator housing 36 about pivot 38 causes a corresponding movement of the release lever 40. During deployment of the RAT assembly 14, the release lever 40 will rotate about pivot 38 until it contacts the stop. Further rotation of RAT assembly 14 once the release lever 40 engages the stop will cause the release cable 50 to apply a force to the turbine release pin 44. The release cable 50 has such a length that it will pull the turbine release pin 44 from the driveshaft aperture once the generator housing 36 has moved past a partially deployed position, thereby unlocking the turbine driveshaft 24. Removal of the turbine release pin 44 allows the turbine driveshaft 24 to rotate freely, and the turbine 20 to operate as intended to generate power.

Figure 3:
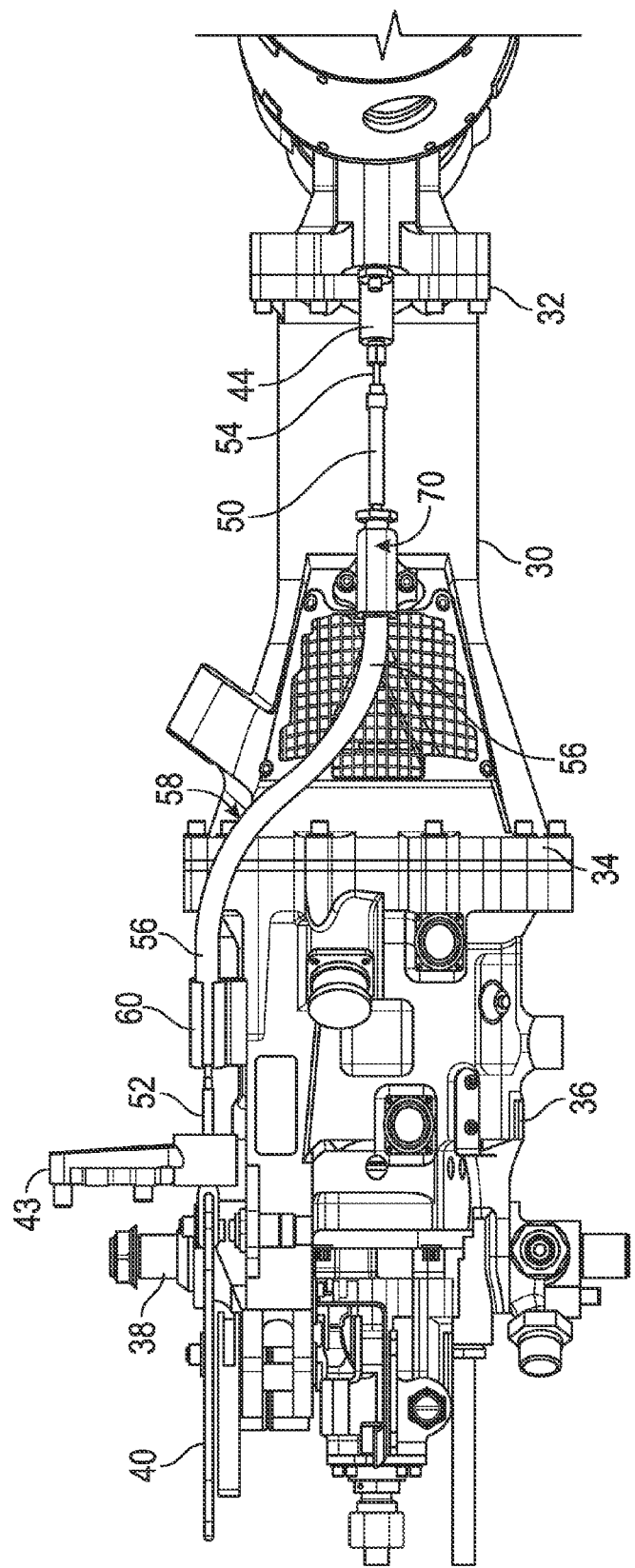
FIG. 3 is a top view of a portion of a ram air turbine assembly according to an embodiment of the invention.
Figure 4:
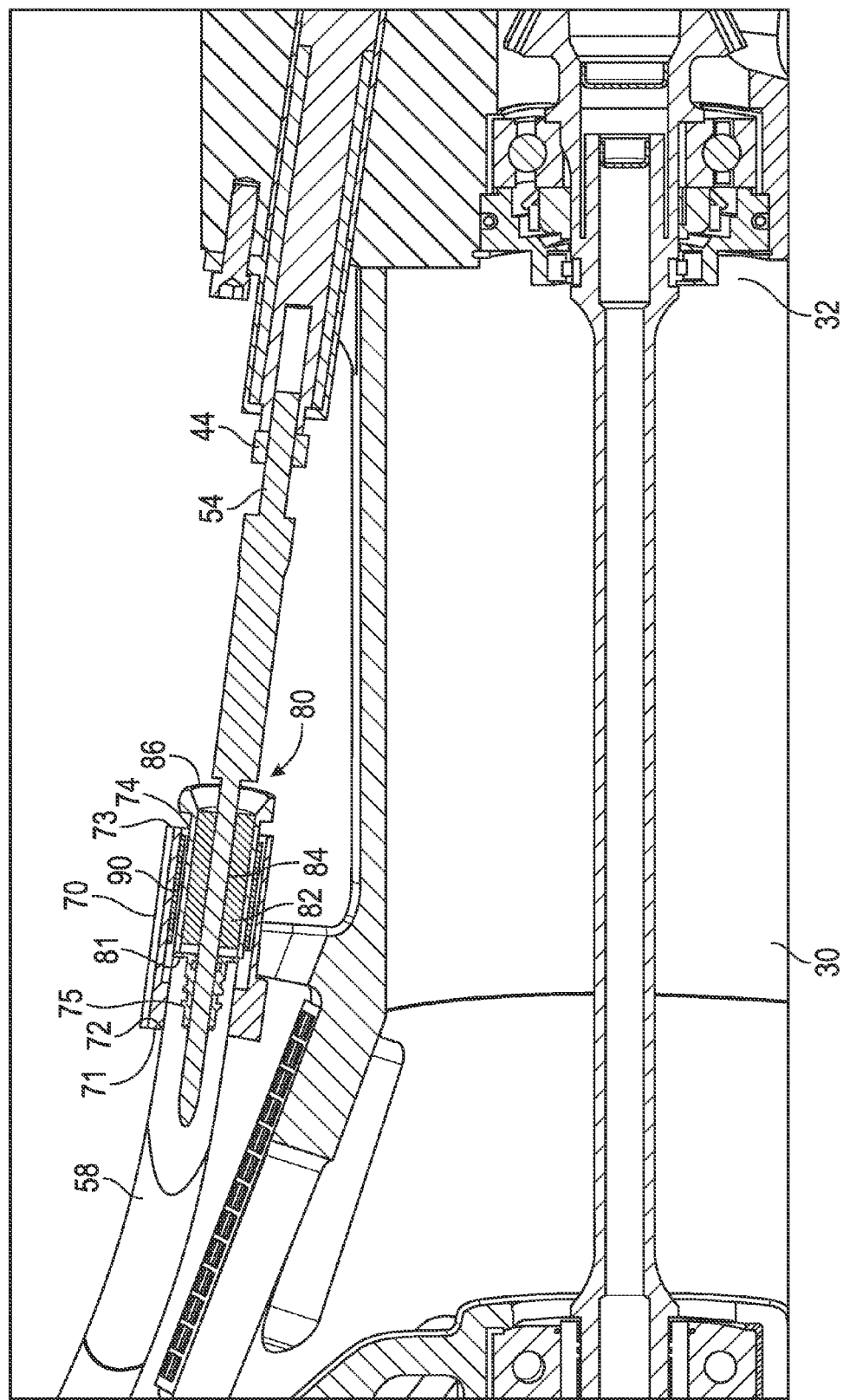
FIG. 4 is a cross-sectional view of a lower cable assembly according to an embodiment of the invention.

In the illustrated embodiment, the RAT assembly 14 is more compact than conventional RAT assemblies. For example, the strut 30 coupling the turbine 20 to the generator housing 36 may have a reduced length. In one embodiment, the strut has a length of about 14 inches. Consequently, the available space within which the release cable 50 may be located is also reduced. FIGS. 3 and 4 illustrate the release cable 50 in more detail. A portion of the release cable 50 near the release lever 40 is supported by an upper cable bracket 60 mounted to the generator housing 36. Similarly, a portion of the release cable 50 adjacent the turbine release pin 44 is supported by a lower cable bracket 70 mounted to the strut 30. The upper cable bracket 60 and the lower cable bracket 70 may be arranged on different surfaces of the RAT assembly 14 such that the portion of the release cable 50 extending between the two brackets 60, 70 includes at least one bend 56. In one embodiment, the portion of the release cable 50 between the upper cable bracket 60 and the lower cable bracket 70 includes two bends 56 forming a general S-shape. The bends 56 of the release cable 50 extending between the upper cable bracket 60 and the lower cable bracket 70 may be disposed within tubing 58, made from a material such as aluminum for example. In one embodiment, the aluminum tubing 58 is heat treated for increased strength. The upper and lower cable brackets 60, 70 constrain axial movement of the tubing 58 when the release cable is stretched, thereby reducing the bending stress of the tubing 58. In one embodiment, the aluminum tubing 58 includes an internal concentric plastic sheath to prevent damage to the release cable 50 as a result of direct contact between the tubing 58 and the release cable 50.

Figure 5:
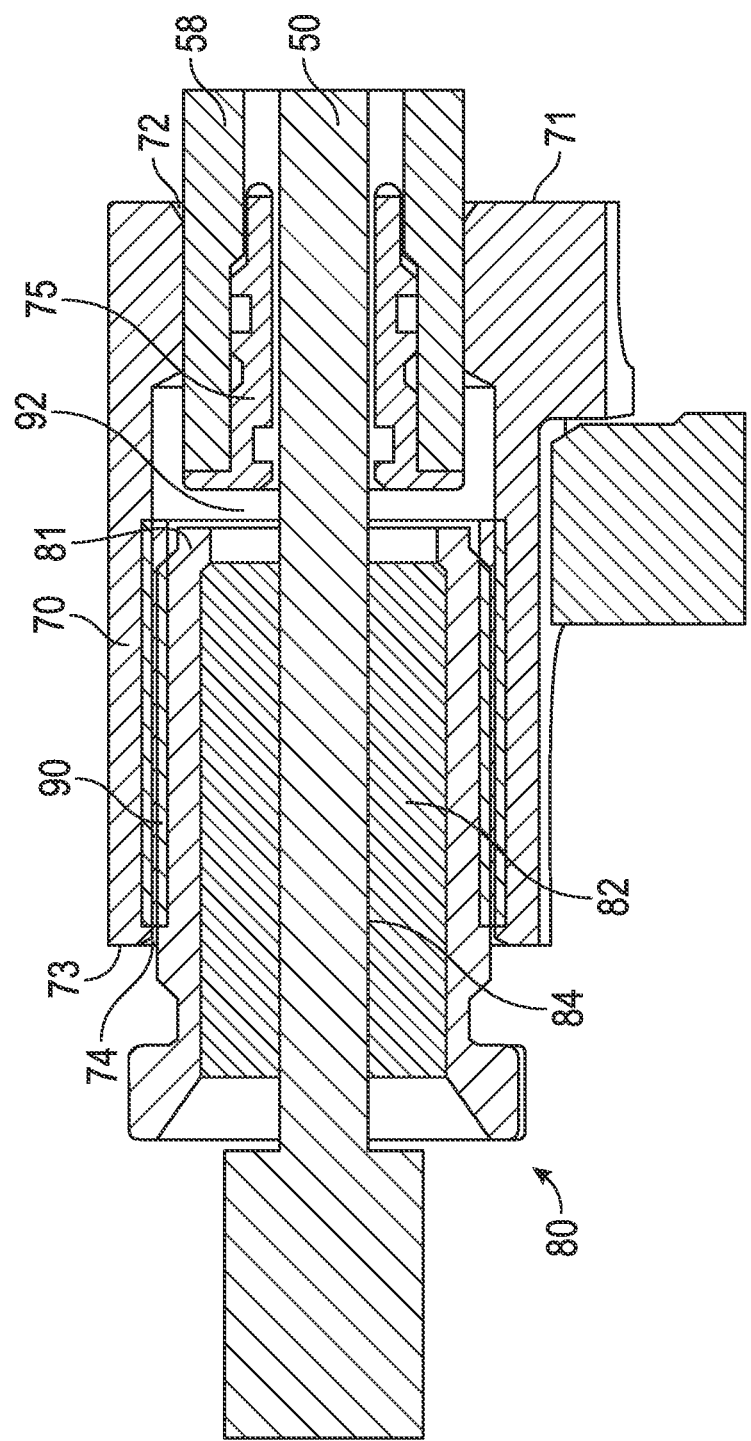
FIG. 5 is a cross-sectional view of a partially assembled lower cable assembly according to an embodiment of the invention.
Figure 6:
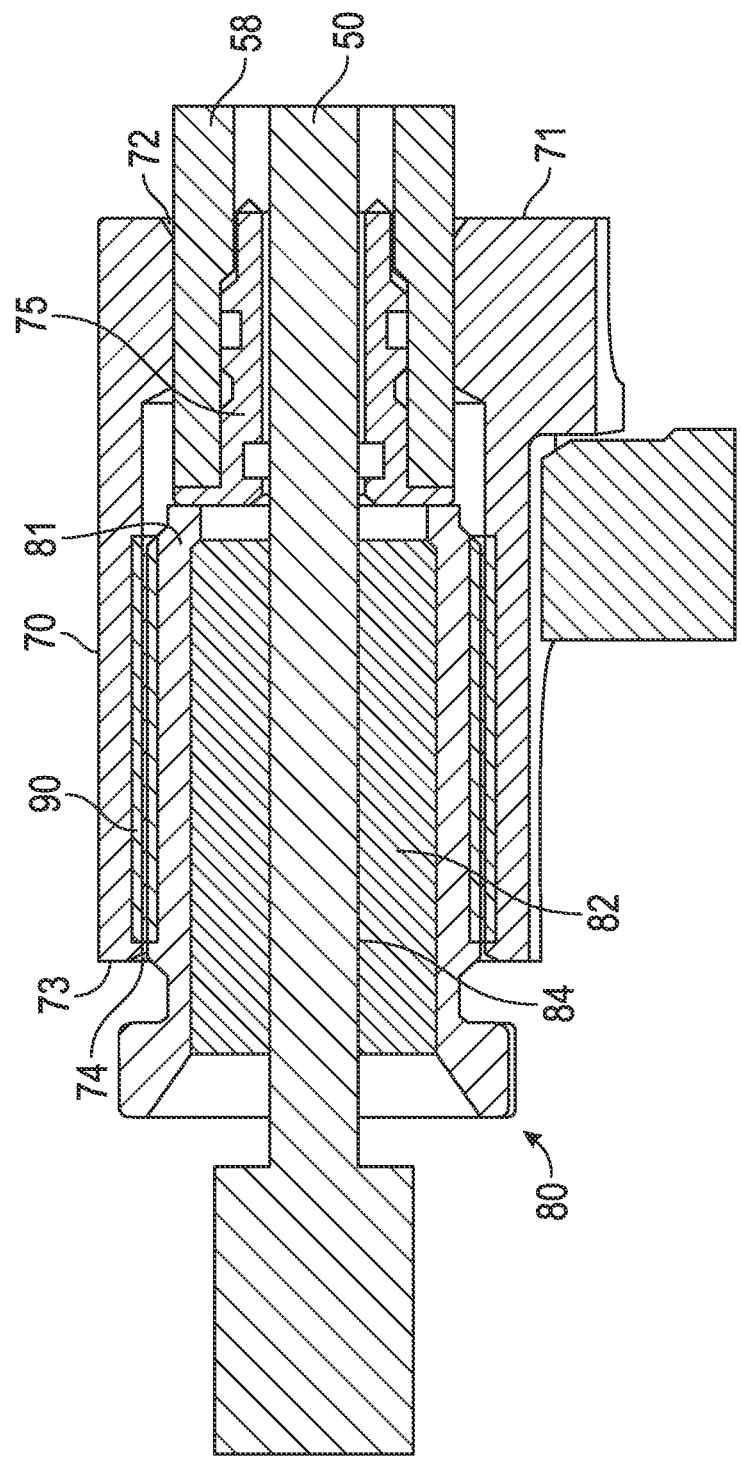
FIG. 6 is a cross-sectional view of an assembled lower cable assembly according to an embodiment of the invention.

Referring now to FIGS. 5 and 6, the lower cable bracket 70 includes a first opening 72 adjacent a first end 71 for receiving an end of the tubing 58 surrounding the release cable 50. The lower cable bracket 70 also includes a second opening 74 adjacent a second end 73 for receiving a shaft 82 of a threaded bushing 80. The threaded bushing 80 includes an axial bore 84 such that the release cable 50 extends through the threaded bushing 80 for connecting to the turbine release pin 44. In one embodiment, a self-locking helical coil 90 is arranged adjacent the inner circumference of the second opening 74. The engagement formed between the helical coil 90 and the shaft 82 of the threaded bushing 80 prevents the threaded bushing 80 from backing out of the lower cable bracket 70 as a result of vibration.

During assembly of the lower cable bracket 70, an adjustment gap 92 exists between the end 81 of the threaded bushing 80 and the end fitting 75 of the tubing 58 (see FIG. 5). Once an end of the tubing 58 is inserted into the first opening 72 and the release cable 50 is fed through the axial bore 84 of the threaded bushing 80, the threaded bushing 80 is rotated until any clearance between the shaft 82 of the threaded bushing 80 and the end fitting 75 of the tubing 58 is removed, thereby eliminating the adjustment gap 92. The assembled lower cable bracket 70 is illustrated in FIG. 6. In one embodiment, the threaded bushing 80 is tightened to a specific torque such that the tubing 58 has an initial preload.

Because the overall length of the RAT assembly 14 is reduced, a shorter release cable 50 is required. By surrounding a portion of the release cable 50 with aluminum tubing 58 rather than stainless steel, the weight of the RAT assembly 14 is decreased compared to conventional assemblies. Conventional stainless steel tubing suitable for bending cannot be heat treated, so it is soft and ductile. Aluminum tubing, however, can be formed in the annealed condition and then heat treated to higher material properties, particularly yield strength, than the softer stainless steel tubing.

When a tension force is applied to the release cable 50 of a conventional RAT assembly, the bends 56 of the tubing 58 are generally straightened creating a high bending stress in the bends 56 of the tubing 58. In the disclosed RAT assembly 14 however, the tubing 58 cannot elongate axially when a force is applied to the release cable 50. By preventing axial movement of the tubing 58 when a load is applied to the release cable 50, the stress in the tubing 58 is reduced significantly. This reduction in stress is achieved by axially restraining the end of the tubing 58 against the adjacent end of the threaded bushing shaft 82. In addition, by restraining the ends of the tubing 58 within the upper and lower cable brackets 60, 70, the stiffness of the aluminum tubing 58 reduces the lateral deformation of the tubing 58.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A release system for a ram air turbine assembly, comprising:
   a release cable coupled at a first end to a turbine release pin and coupled at a second end to a release lever;
   an aluminum tubing surrounding a portion of the release cable;
   an upper cable bracket for supporting the aluminum tubing adjacent the first end of the release cable; and
   a lower cable bracket for supporting the aluminum tubing adjacent the second end of the release cable, the lower cable bracket including a threaded bushing having an axial bore for receiving the release cable, a shaft of the threaded bushing being at least partially arranged within a first opening formed in the lower cable bracket, wherein the threaded bushing is in direct contact with an end fitting coupled to the aluminum tubing.

2. The release system according to claim 1, wherein the aluminum tubing is heat treated.

3. The release system according to claim 1, wherein the aluminum tubing includes an internal concentric plastic sheath.

4. The release system according to claim 1, upper cable bracket and the lower cable bracket are mounted to the ram air turbine assembly in a non-linear orientation.

5. The release system according to claim 4, wherein the aluminum tubing includes at least one bend.

6. The release system according to claim 5, wherein the aluminum tubing includes two bends arranged in a generally s-shaped configuration.

7. The release system according to claim 1, wherein the lower cable bracket includes a self-locking helical coil.

8. The release system according to claim 7, wherein the helical coil engages a portion of the threaded bushing to prevent movement of the threaded bushing away from the lower cable bracket.

9. A ram air turbine assembly comprising:
a lower cable bracket for supporting a release cable and a first end of an aluminum tubing surrounding the release cable, the lower cable bracket including a threaded bushing having an axial bore for receiving the release cable, a shaft of the threaded bushing being at least partially arranged within a first opening formed in a first end of the lower cable bracket, wherein the threaded bushing directly contacts an end fitting coupled to the first end of the aluminum tubing.

10. The ram air turbine assembly according to claim 9, wherein the lower cable bracket includes a second opening adjacent a second end.

11. The ram air turbine assembly according to claim 10, the first end of the aluminum tubing is received in the first opening.

12. The ram air turbine assembly according to claim 10, wherein the threaded bushing is received in the second opening.

13. The ram air turbine assembly according to claim 12, wherein a self-locking helical coil is arranged concentrically within the second opening and a portion of the helical coil engages a portion of the threaded bushing.

* * * * *